United States Patent
Ellingsen

Patent Number: 5,914,027
Date of Patent: Jun. 22, 1999

[54] THERMO-MECHANICAL CRACKING AND HYDROGENATION

[75] Inventor: Olav Ellingsen, Florø, Norway

[73] Assignee: Thermtech A/S, Kokstad, Norway

[21] Appl. No.: 08/814,333

[22] Filed: Mar. 11, 1997

Related U.S. Application Data

[63] Continuation of application No. PCT/NO95/00157, Sep. 8, 1995.

[30] Foreign Application Priority Data

Sep. 12, 1994 [NO] Norway .................................. 943367

[51] Int. Cl.$^6$ .................................................. C10G 47/30
[52] U.S. Cl. ........................ 208/126; 208/127; 208/130; 208/107
[58] Field of Search .................................. 208/126, 127, 208/130, 107

[56] References Cited

U.S. PATENT DOCUMENTS

| | | | |
|---|---|---|---|
| 3,282,826 | 11/1966 | Winkler | 208/8 |
| 3,963,598 | 6/1976 | Manowitz et al. | |
| 4,250,015 | 2/1981 | Yang et al. | 208/10 |
| 4,287,157 | 9/1981 | Koch | 422/205 |
| 4,316,873 | 2/1982 | Koch | |
| 4,344,835 | 8/1982 | Koch | |
| 4,344,836 | 8/1982 | Koch | 208/8 R |

FOREIGN PATENT DOCUMENTS

| | | |
|---|---|---|
| 175847 | 12/1994 | Norway. |
| 9408680 | 4/1994 | WIPO. |
| WO 94/08680 | 4/1994 | WIPO. |

OTHER PUBLICATIONS

Abstract of (DE 3300365), Title:Carbonisation of of Residue From Hydrogenation of Heavy Oil or Coal–In Rotating Drum, Heated in Rotating Drum, Heated Internally by Heated Carbonisation Prod. Gas, Jul. 12, 1984.

Primary Examiner—Walter D. Griffin
Assistant Examiner—Nadine Preisch
Attorney, Agent, or Firm—Merchant, Gould, Smith, Edell, Welter & Schmidt

[57] ABSTRACT

A method for thermo-mechanical cracking and hydrogenation of chemical substances such as hydrocarbons in liquid or solid form, waxes, carbonates, lime, oil-shale, oil-sand, oily residue from refineries and crude tank bottoms, plast and the like. The cracking and the hydrogenating of the substances in the presence of hydrogen releasing chemicals as water is performed in a mechanical established fluidized bed (8) of fine grained solids where the mechanical action in the fluidized bed (8) generates the heat participating in the cracking in addition to the mechanical action to the substances whereby the cracking in the cavitating micro bubbles and the hydrogenation takes place in the reactor (1) with an overall temperature and pressure lower than by conventional cracking and/or hydrogenation processes.

4 Claims, 9 Drawing Sheets

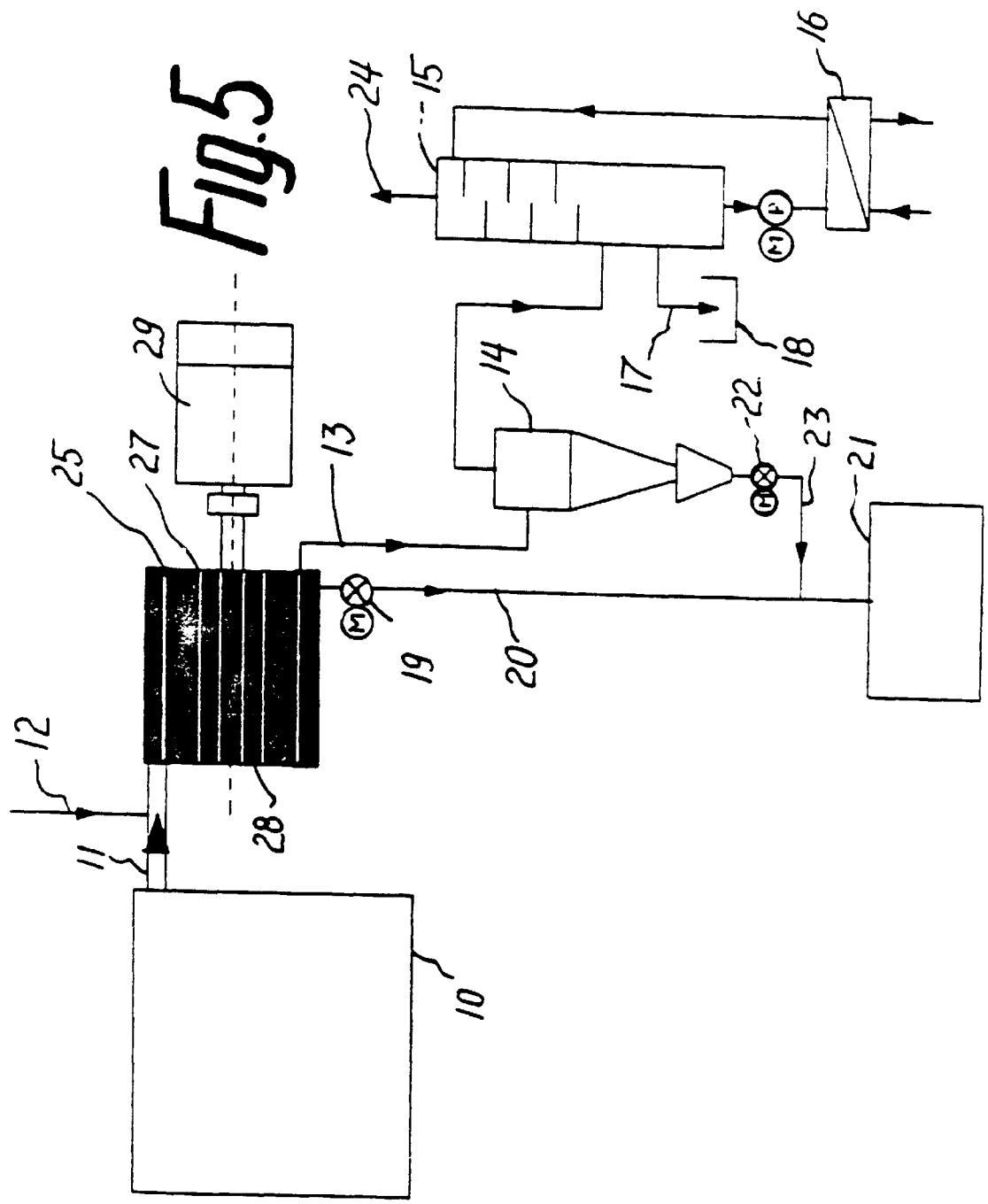

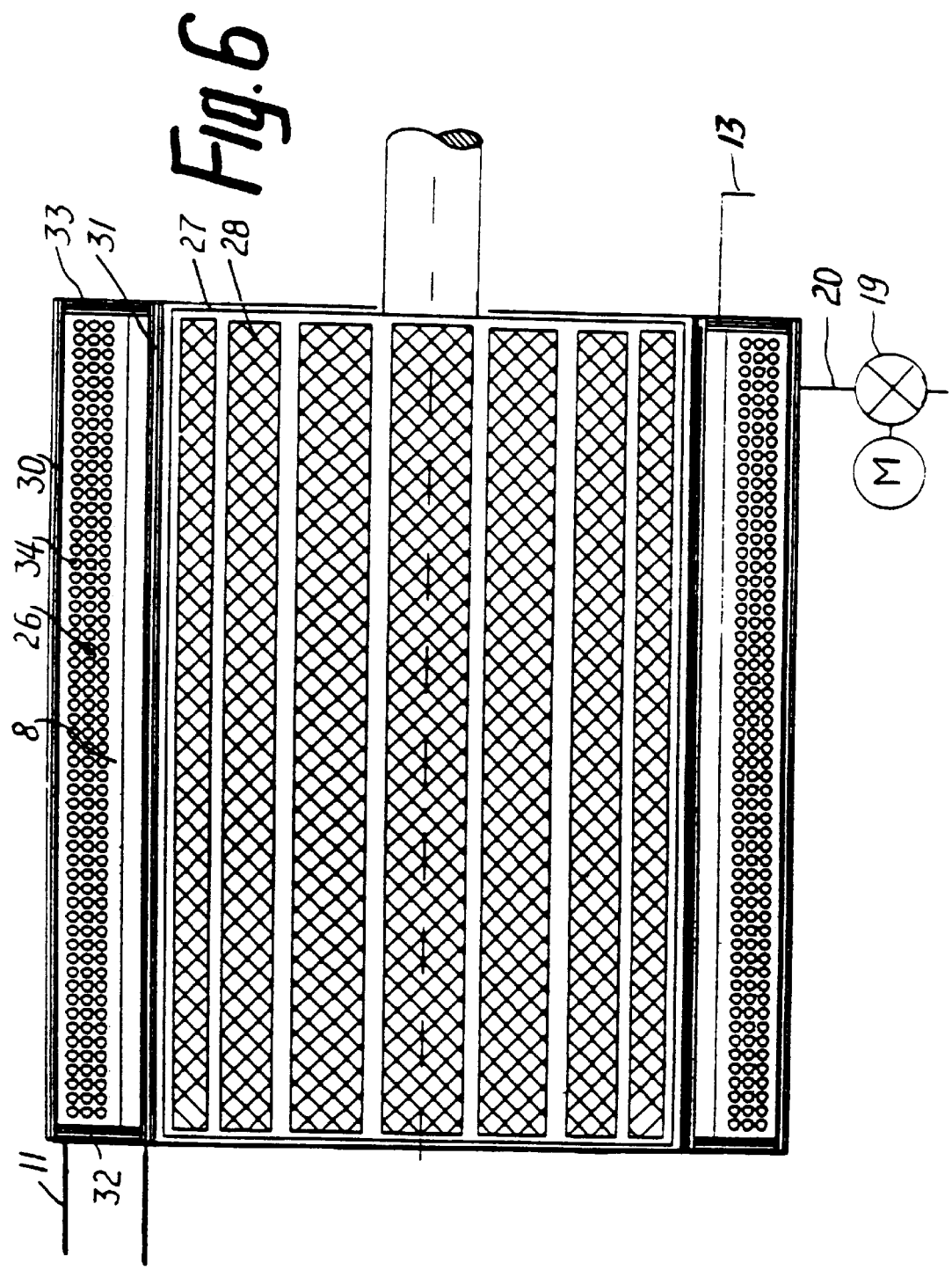

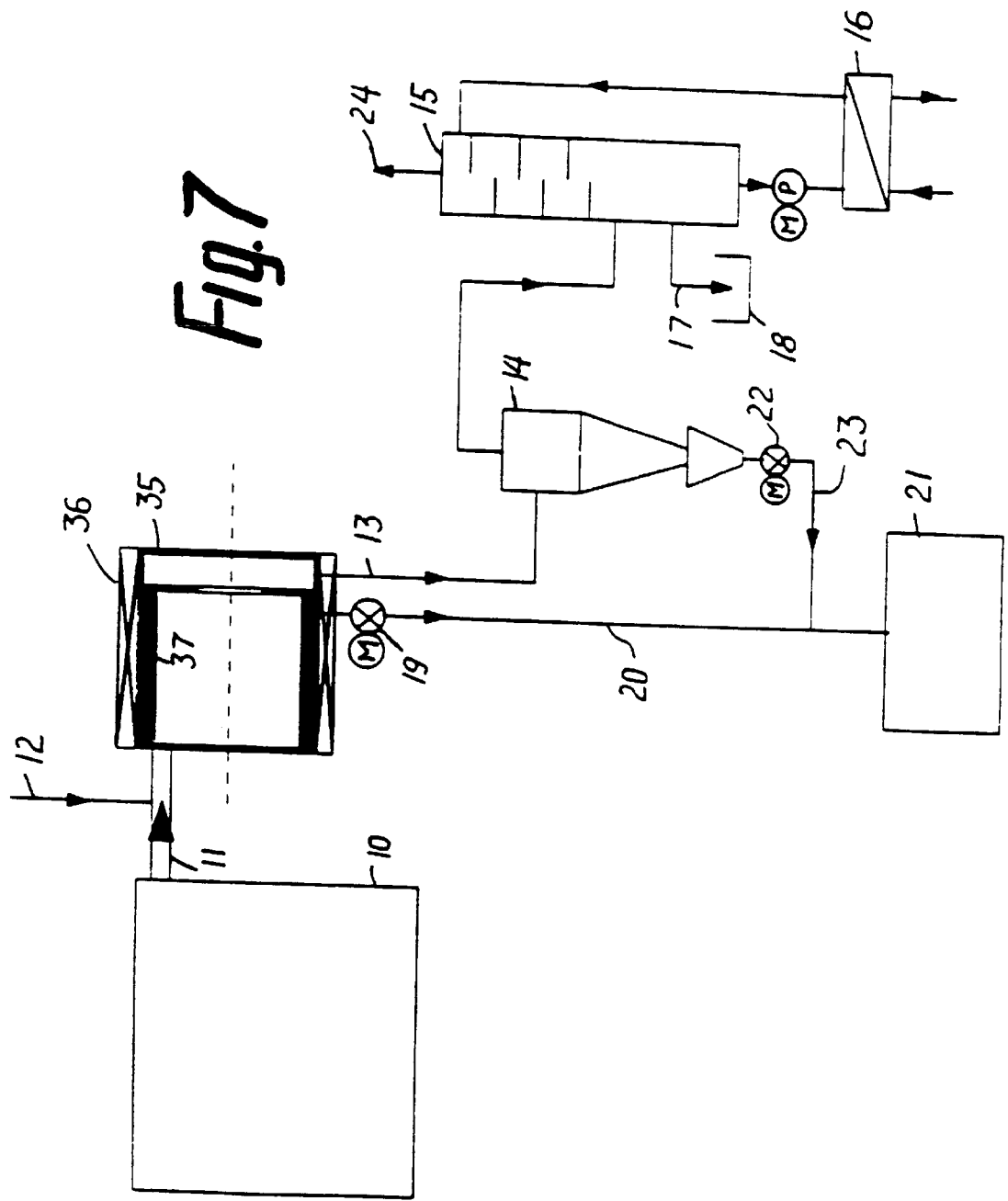

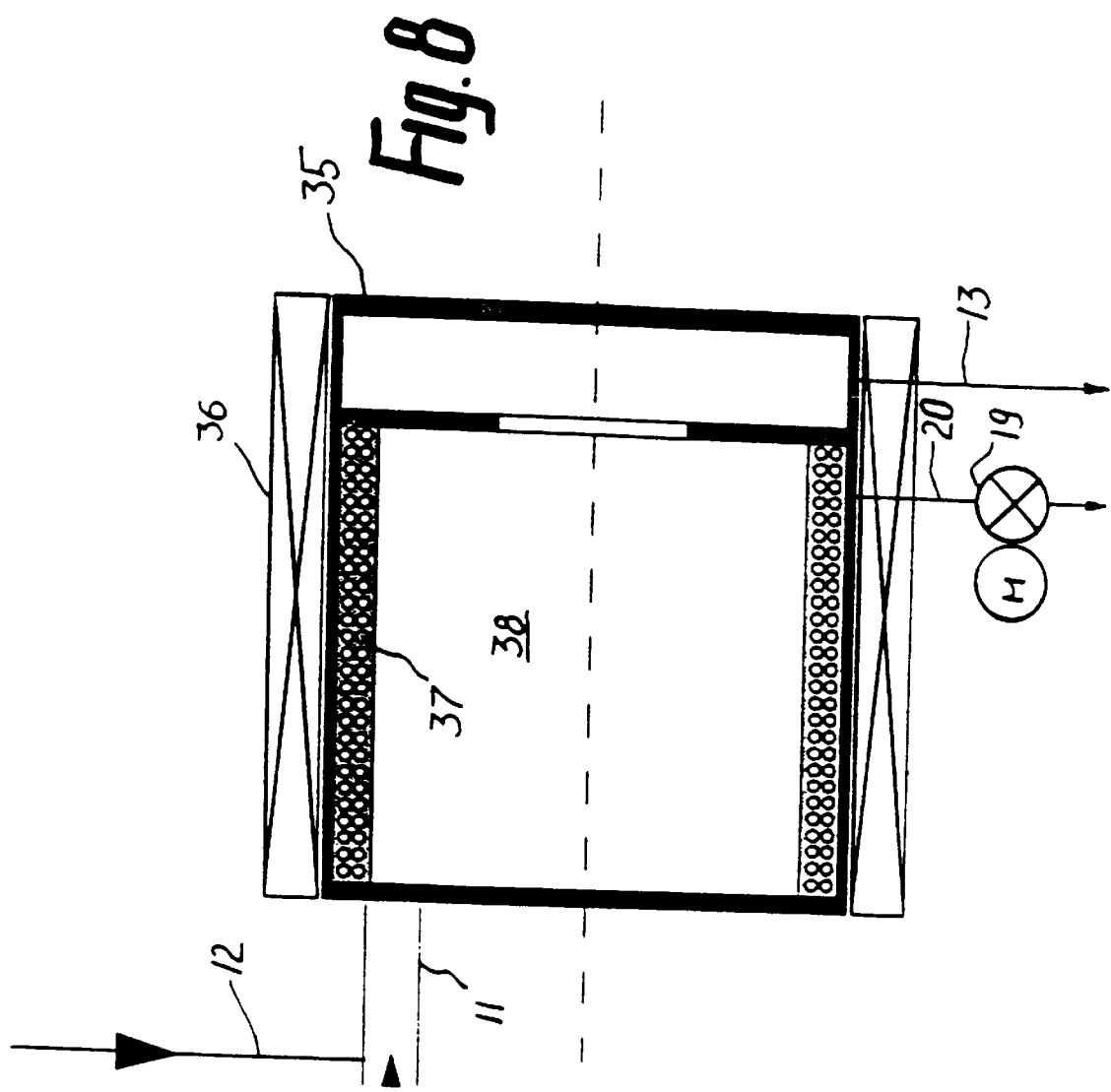

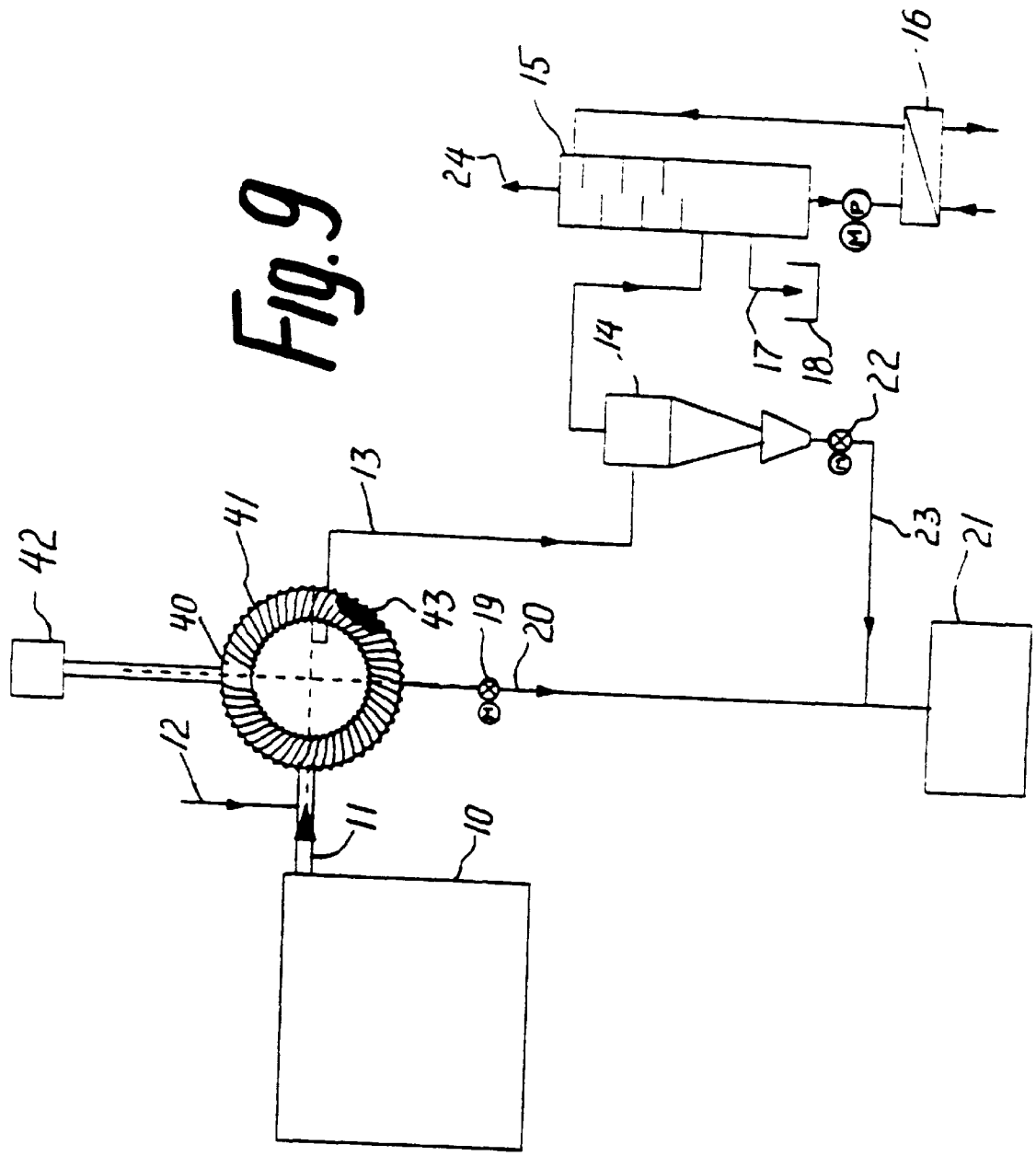

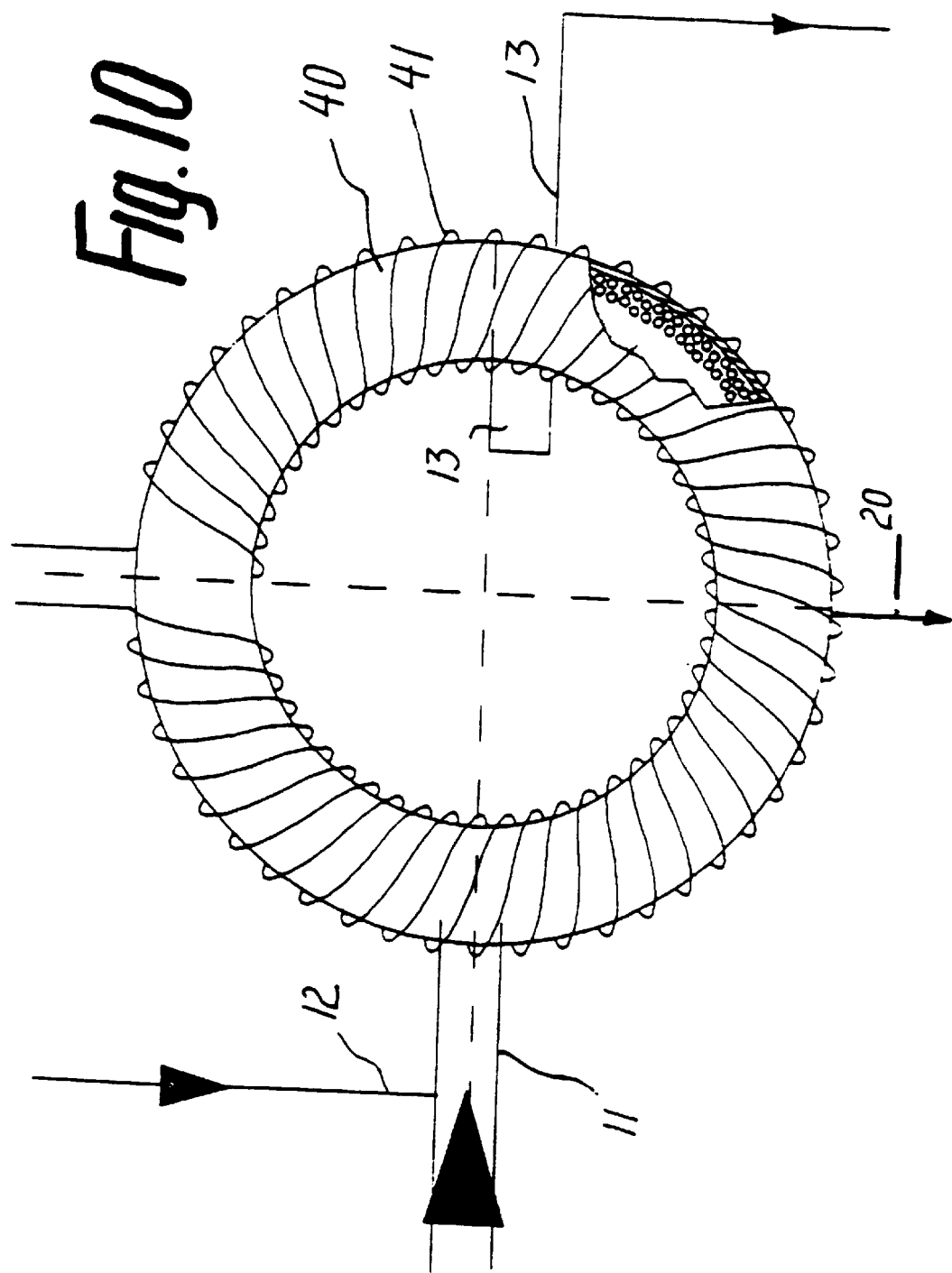

THERMO-MECHANICAL CRACKING AND HYDROGENATION

This is a continuation of PCT/NO95/00157 application filed Sep. 8, 1995.

BACKGROUND OF THE INVENTION

The balancing of product yield and marked demand of gasoline supplies, without the manufacture of large quantities of fractions having low commercial value, has for a long time required processes for the conversion of hydrocarbons of high molecular weight range and/or structure into smaller molecular weight range and/or structure. Basic processes for this are still the so called cracking processes in which heavy hydrocarbons and residues are broken down "cracked" into smaller, lower boiling molecules in the presence of high temperatures (380–540 C.), high pressures (100>1000 psi) and often in the presence of added catalyst.

The energy to break the molecular bonds in refinery cracking processes is supplied by thermal motion of the molecules subjected to heating and excess pressure in addition to the effects of added catalyst(s).

BRIEF SUMMARY OF THE INVENTION

The present invention describes a method of achieving high efficiency cracking of carbonaceous material at low temperatures and pressure and with use of less energy than any known methods. The carbonaceous material consists of high molecular weight hydrocarbons, petroleum residues, plastic, rubber in either liquid or solid state.

The principle of the process is to treat the carbonaceous material in a mechanical established hot fluidized bed containing water and solids to achieve cracking in order to recover valuable oil products from:

1. Oil contaminated solids and sludge.
2. Tar sands.
3. Refinery feedstocks.
4. Plastics, rubbers and other carbonaceous material.

The mechanically fluidized bed generated in a process chamber can be established by different means. One practical means is to apply a hammer-mill construction. A second way is to use a ball-mill construction. It is also possible to establish a fluidized bed by using magnetic metal as bed material put into rapid motion by magnetic forces induced by an electrical coil surrounding the process chamber vessel.

The hydrodynamic behavior in the new process is a complex subject. It takes into consideration bed behavior, the mechanics of bubbles and flow models. The description of bed behavior includes observations about pressure fluctuations, flow regimes, incipient fluidization, phase hold-ups and solids entrainment, solids wettability and surface tension effects and overall bed rheology. The hydrodynamics, chemical reactor kinetics and final product composition, heat and mass transfer are strongly influenced by external means such as mechanical agitation which again are closely linked to operational aspects and mechanical motion of the bed.

Being a thermo-mechanical process, it is unique to other thermodynamic processes in several respects:

1. The fluidized bed condition of the mass in the reactor acts as a very efficient heat transfer fluid. The energy requirement of the process us very favorable compared to other processes as no external heating is required. The heat is applied in-situ by abrasion and agitation of the treated material.

2. Under steady-state reactor conditions and in the presence of water and solids a major advantage of the new technology is the reduction of high-boiling oil feedstock materials to make products in the middle distillate range, diesel oil or light gas oil of high economic value.

3. All high molecular weight material including asphaltenes and resins are subject to cracking to lower molecular weight compounds. Only trace amounts of residue or coke is being formed in the process under steady-state conditions. The fluidized bed condition of the mass in the reactor under steady state conditions acts as a diluent to inhibit bimolecular addition for condensation reactions relative to uni-molecular cracking reactions.

General observations of the chemical product composition of the final products:

1. Dependent on the chemical composition of the feedstock to the reactor.
2. A marked reduction in density/API gravity of product compared with the original feedstock if the latter is of high molecular weight.
3. One rather striking feature of the product composition is the fact that terminal olefins are virtually absent.
4. A marked reduction in the content of total aromatic hydrocarbons with a distribution shift from polycondensed aromatics (PAH) towards monoaromatics and diaromatics (napthenoaromatis) in the "refined" product composition. This strongly suggests that polycondensed aromatics (PAH) are being hydrogenated.
5. The aliphatic fraction of the products is characterized by a marked increase of cyclic alkanes compared with the corresponding feedstock. This may in part be due to hydrogenation of aromatics in the original feedstock as mentioned above.
6. The content of polar components in the products are considerably lower than the original material. Sulphur is being reduced by approx. 15% of feedstocks with rather limited content of metals like V and Ni as in residues from several North Sea crude oils. In residues of crude oils from the Middle East (Kuwait) that contain appreciable large amounts of metals sulphur content has been reduced by close to 60%.

Initially sulphur is being removed from thiophene type structures (abundant in Middle East crude oil) and less abundant in crude oils from the North Sea as $H_2S$ which is partly reacted with nickel and vanadium oxides from Porphyrinic compounds to the corresponding sulphides and partly transformed to elemental sulphur which again react with the naphthenoaromatic compounds under the experimental reactor conditions. Higher concentrations of metals nickel and vanadium leaves less $H_2S$ to be transferred to elemental sulphur and which can enter into "new" reactions with naphthenoaromatics.

7. The nitrogen removal is estimated to approx. 85%.
8. Oxygen is estimated to close to 90%. Most of the functional groups in this category contains substituents of —OH and —COOH type that will not survive the reactor conditions in the process.
9. The thermic cracking leads to en efficient removal of metals from the original feedstock with a decline in Ni of 88% and V of >95%.
10. Non-condensable gases amounting to <5% of the total mass of the original feedstock for many types of feedstocks (exceptions are coke and oil-shale) under steady state conditions consist mainly of $CO_2$, $CO$, $N_2$, $CH_4$, $H_2$, $O_2$ and low concentrations of ethane and propane. Only trace amounts of $H_2S$, $SO_2$, RSR, RSSR, $NH_3$ and $NO_x$ have been observed. Minute amount of organic sulphides (RSR) and organic disulphides (RSSR) have observed.

The creation of transient cavitation bubbles of high pressure (>300 bars) and temperature (>5000 E) is due to the hydrodynamic conditions in the reaction chamber. Hydrodynamic cavitation can affect a liquid through two possible avenues. The first is that the liquid is disrupted by inhomogeneous presence of the bubbles. The second avenue through which cavitation affects a fluid is bubble dynamics. The main interest in cavitation bubble dynamics arises from the destructive action due to the collapse of bubbles in liquids near solid boundaries.

Extremely high temperatures and pressures are being produced in the final phase of implosion. The vibrations of bubbles are so fast that little heat exchange occurs with the liquid environment. The vapor therefore is strongly heated in the compression phase. Chemical reactions may take place in the hot gas bubbles, and these reactions may be understood in terms of what is known from combustion chemistry. Other reactions occur in the cooler interfacial region between the gas bubble and the liquid and may be understood in light of radiation chemistry of solutions. High molecular weight components may be decomposed by free radical attack and by direct thermal action. This phase is characterized by strong temperature and pressure gradients. An important feature of the kinetics of these reactions in the accumulation of non volatile hydrophobc components at this interface. This fact combined with temperatures of many hundred degrees or even more than thousand degrees K, high pressures and short reaction times (<100 nsec) decide the final product composition.

Quenching of the released heat from the micro-bubbles prevents the formation of the cracking elements into longchained compounds and coke. The vibrations of bubbles are so fast that little heat exchange occurs with the liquid environment.

Thermal dissolution of water in the compression phase (following the expansion phase) of the oscillating gas bubble form hydrogen atoms- and hydroxy-radicals. Reactions of the radicals have to be discussed in terms of what is known from combustion chemistry whereas diffusion of the radicals to the cooler interfacial area undergo reaction known from radiation chemistry. The radicals which reach the interfacial region are present in very high concentrations.

This is also a very important factor in explaining the chemical composition of the final reaction products.

Technology based on the invention is environmental friendly as emission to air and discharge to water is kept at a minimum.

As previously mentioned hydrodynamics, chemical reactor kinetics, heat and mass transfer are closely linked to operational aspects and mechanical motion of the bed in process. The latter is established in such a manner that the energy to establish the bed also delivers enough energy to heat it to the desired process temperature and to maintain the tmperature during the process. This is achieved by whipping and crushing the oil-water-soild mixture with mechanical means generating the bed.

A substantial higher pressure (a pressure front) is generated in the front of the mechanical means against the fluidized solids. The crushing of the particles that takes place in the front and at the sides of the mechanical means, gives rise to local overheating of the material. The direct effect of this is that the gas/liquid already present in cracks and crevices of solid particles will be compressed and obtain a higher temperatures than the bulk fluidized bed temperature. As this "overheated" gas/liquid in the next moment ends up on the "back-side" of the mechanical means and are subjected to an extremely rapid pressure drop, the gas will expand rapidly together with intensive boiling and an explosive evaporation of liquid components creating a tremendous turbulence. Mechanical agitation results in the establishment of a "moving" pressure/temperature condition on all praticles in the vicinity of the mechanical means this is different from the general conditions in the process chamber. This leads to an instantaneous evaporation of water and the hydrocarbon fractions that have a boiling point below the temperature corresponding to the partial pressure under the given process conditions. The evaporation proceeds so quickly that it can crush a larger portion of the heavier hydrocarbons into mist which when depending upon the partial pressure can migrate into the transitating cavitating bubbles described below.

Cracks and crevices in the solids are also acting as nucleation sites of cavitating bubbles which refers to the growth of preexisting gas pockets or microbubble into a macroscopically observable bubble. Apparently the cracks and crevices are imperfectly wetted by the liquid and so contain gas pockets that acts as sites of bubble growth. These bubbles can expand to may times their original size. Containing mostly vapour from the liquid these transient cavities collapse violently as there is little residual permanent gas to cushion the implosion. The chemical reaction kinetics of the involatile components described earlier have their origin in these collapsing bubbles generated by the shock vaves induced by colliding particles (solids) from the fluidized bed. The frequency of the violently pulsating shock vaves can be expressed as a relation between the speed of the moving object and the relative speed and directions of the particles and the size of the solid particles in the fluidized bed. The intensity of these effects increases by $v^3$ where v is the peripheral speed of the moving mechanical means and thus even small adjustments of the speed will have a major impact of the chemical reaction kinetics in the reactor. Collapsing transient cavities are believed to occur mainly in liquids exposed to higher intensities. For a liquid stimulated by sonic energy this value has been found to be >10 W/cm5. A typical frequency of the oscillating shock vaves in a process according to the invention has been calculated to be in the area of 1600 kHz.

BRIEF DESCRIPTION OF DRAWINGS

By the reference to the following drawings, some potential lay-out of the process is now described.

FIG. 5 shows an alternative reactor system according to the invention,

FIG. 6 shows a longitudinal cross section of the reactor in FIG. 5,

FIG. 7 shows a further alternative reactor system according to the invention,

FIG. 8 shows a longitudinal cross section of the reactor in FIG. 7,

FIG. 9 shows a third alternative reactor system according to the invention, and

FIG. 10 shows the reactor in FIG. 9 in greater scale.

DETAILED DESCRIPTION OF THE INVENTION

Figure 2:
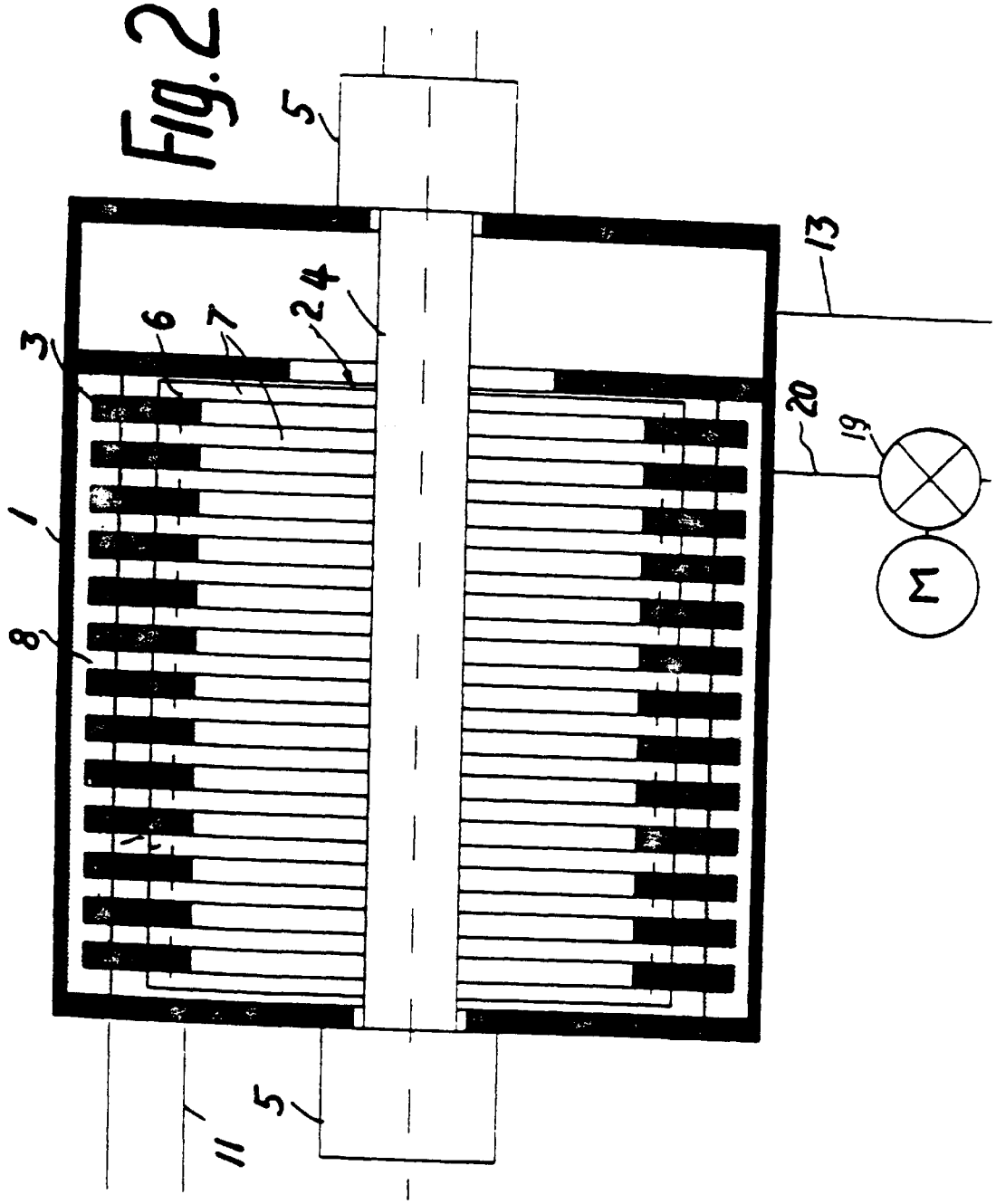
FIG. 2 shows a longitudinal cross section of the reactor in FIG. 1.
Figure 3:
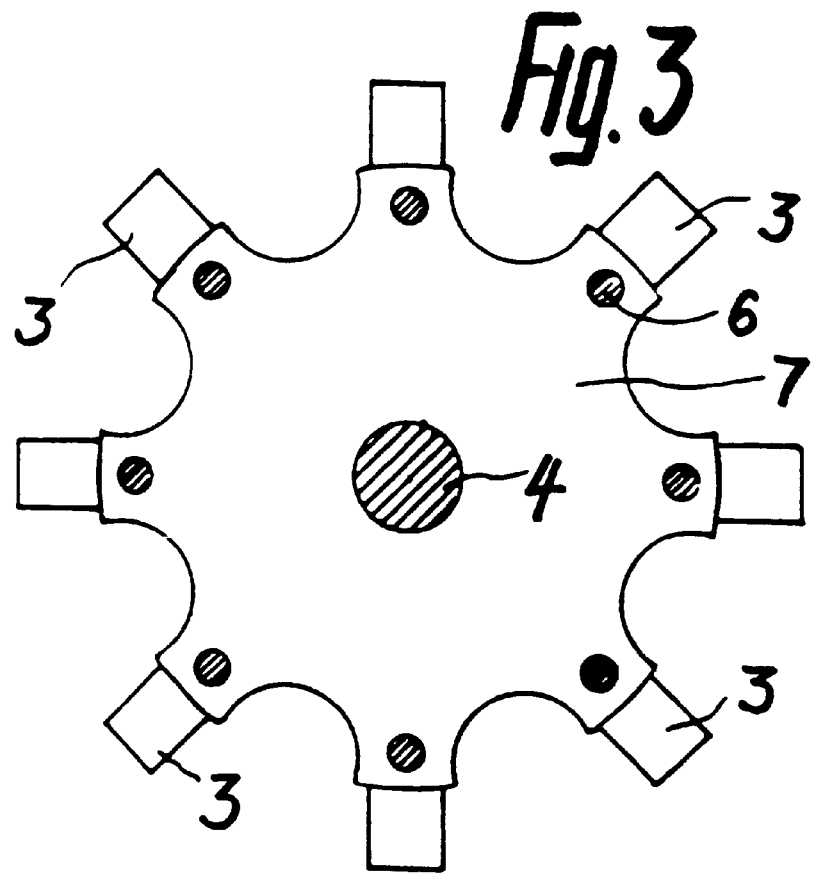
FIG. 3 shows a rotor used in the reactor in FIG. 1 and 2.

FIG. 2 shows a reactor chamber or vessel 1 with a rotor 2 including friction elements 3. The rotor 2 further includes a shaft 4 sealed in the reactor with mechanical seals 5. The friction elements 3 are pivotably mounted at G (see also FIG. 3) in the rotor plates 7. In the embodiment shown each pair of adjacent rotor plates 7 carries a number of friction elements 3 (the remaining elements in FIG. 3 belong to the next rotor plate pair). Thus the friction elements 3 are staggered relative the next set of friction elements. In the shown lay-out there may of course be a total of eight friction elements in each set. The staggered arrangement is however believed to achieve a better turbulent action in the bed 8 (FIG. 2) of grained solids.

By larger process chambers, the number of friction elements will increase accordingly and in relation ot the amount of power delivered to the rotor 4.

Figure 4:
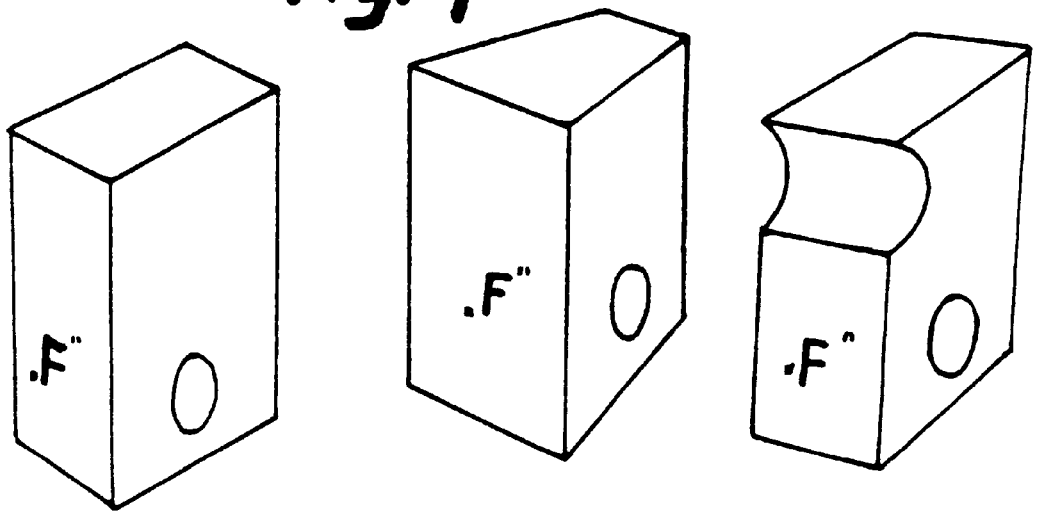
FIG. 4 shows possible embodiments of friction elements.

The friction elements may have a number of forms, three of which being disclosed in FIG. 4a, b, and c. The forward or impact faces of the friction elements in FIG. 4 are depicted with the letter "F".

The friction elements 3 are pivotable mounted in between adjacent rotor plates 7 by means of rods 6 extending over the length of the rotor 2.

Figure 1:
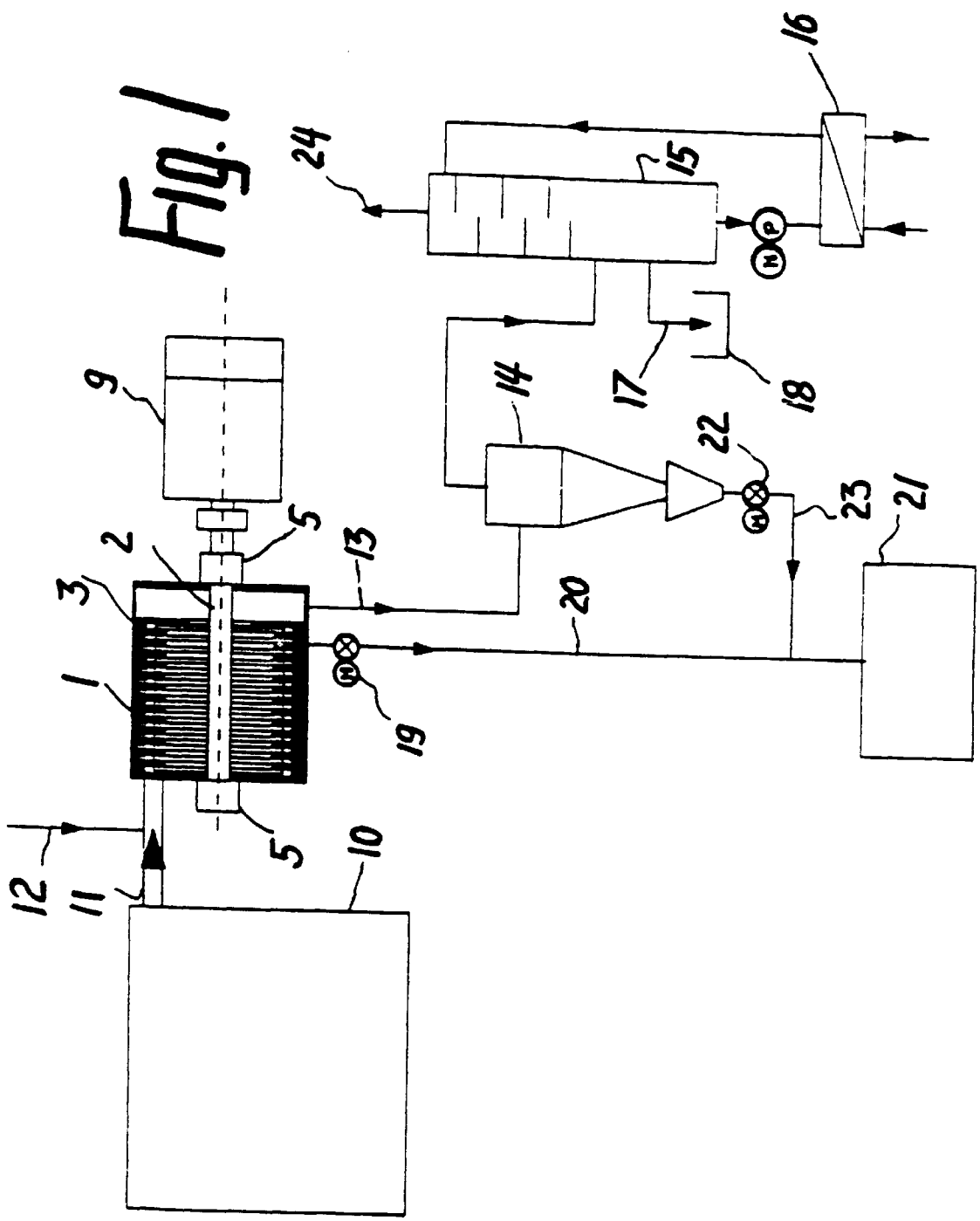
FIG. 1 shows a reactor system according to the invention.

Referring now to FIG. 1 one can observe that the rotor 2 is driven by a rotating source 9 which can be an electrical motor, a diesel engine, a gas or steam turbine or the like. The material is brought to the reactor from a hopper 10 by a feeding device 11 which may be a screw-conveyor, mono-pump or a similar transport device. If the material does not contain water, water can be added to the flow from the pipe 12.

The cracked hydrocarbon gases and over-saturated steam is leaving the reactor via the pipe 12 and a cyclone 14 and proceed to a condenser unit 15 which can be a baffle tray condenser, a tubular condenser or a distillation tower. The different fractions of the oil can be separated directly from the recovered hydrocarbon gases. The heat from condensation is removed by an oil cooler 16 cooled either by water or air. The recovered oil is discharged from the condenser by a pipe 17 to a tank 18.

The solids is leaving the reactor via a rotating valve 19 and a tansport device 20 which can be a screw or belt conveyor or an air transportation pipe system to a container 21. The solids separated from the cyclone 14 is transported via a rotating valve 22 to the container 21 either by being connected to the transport device 20 or directly to the container 21 by a cyclone transport device 23.

Outlet for non-condensable gases is from the pipe 24 to a filter unit or to a flare tower or being accumulated in a pressure tank—not shown.

FIG. 5 shows another lay-out of the reaction chamber 25 consisting of two concentric pipes of non-magnetic material with closed ends. The annulus 26 is filled with small steel balls which are brought into rotation by the rotor 27 having permanent or electrical charged magnets 28. When the rotor rotates by means of the motor 29 the magnetic field will rotate the steel balls thus whipping the material fed into the reactor from the hopper 10. The outlet for the hydrocarbon gases, over-saturated steam and solid is as illustrated in the schematics of FIG. 1.

FIG. 6 shows details of the reactor 25. The reactor 25 comprises two concentric tubular bodies 30 and 31 with annular plates 32 and 33 thus forming the annulus 26. The annulus 26 contains steel balls 34 which are brought to move by the rotor 27 having permanent or electrical charged magnets 28.

FIG. 7 shows another lay-out of a reactor 35 made of non-magnetic material having an electrical coil 36 as in a synchronous motor surrounding the reactor. The reaction chamber contains steel balls 37 which is put into rotation when activating the coil 36 by alternating current similar to a synchronous electrical motor thus whipping the material fed into the reactor from the hopper 10. The outlet of the hydrocarbon gases, over-saturated steam and solids is as illustrated in the schematics of FIG. 1.

FIG. 8 visualises details of the reactor 35. The reactor 35 comprises a vessel made of non-magnetic material having an electrical coil 36 surrounding the vessel. The vessel includes a reaction chamber 38 which contains steel balls 37. These steel balls are activated to move adjacent the chamber wall when the coil 36 is activated by alternating current.

FIG. 9 and 10 show another lay-out of a reactor 40 made of a non-magnetic material surrounded with magnetic coils 41 as in a torrid magnet. The coils are activated with alternating current from a source 42. The hollow reactor is partly filled with either steel balls 43 or balls of magneto-strictive material that will oscillate when subject to an alternating magnetic field, thus applying mechanical forces to the material fed into the reactor from the hopper 10. When using steel balls only, the balls will rotate in the torrid reactor, thus whipping the material and creating mechanical generated heat in it. The outlet for the hydrocarbon gases, over-saturated steam and solids is as illustrated in the schematics of FIG. 1.

I claim:

1. A method for thermo-mechanical cracking and hydrogenation of carbonaceous material, wherein the cracking and the hydrogenating of the carbonaceous material is performed in a mechanically fluidized bed of the carbonaceous material within a reactor in the presence of water, where the mechanical action in the fluidized bed generates heat participating in the cracking in addition to generating cavitating microbubbles in the water.

2. A method for thermo-mechanical cracking and hydrogenation in accordance with claim 1, including using moveable friction elements to contact the carbonaceous material within the reactor.

3. A method for thermo-mechanical cracking and hydrogenation in accordance with claim 2, wherein the friction elements are mounted on a rotor, and further including rotating the rotor so that the friction elements contact the carbonaceous material.

4. A method for thermo-mechanical cracking and hydrogenation in accordance with claim 2, further comprising using steel balls as the friction elements, and further applying magnetic forces to the steel balls such that the steel balls contact the carbonaceous material.

* * * * *